Figure 1:
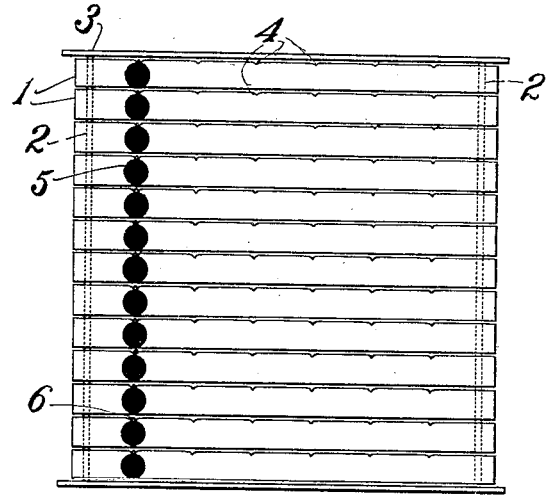

M. S. WHITMAN.
DEVICE FOR TEACHING MUSIC.
APPLICATION FILED NOV. 17, 1908.

964,593.

Patented July 19, 1910.

2 SHEETS—SHEET 1.

WITNESSES
A. T. Palmer
R. B. Ellis

INVENTOR
MATILDA S. WHITMAN
BY Otis Spear Jr.
ATTY.

M. S. WHITMAN.
DEVICE FOR TEACHING MUSIC.
APPLICATION FILED NOV. 17, 1908.

964,593.

Patented July 19, 1910.
2 SHEETS—SHEET 2.

WITNESSES
A. T. Palmer
N. B. Ellms

INVENTOR
MATILDA S. WHITMAN
BY Ellis Spear Jr.
ATTY

THE NORRIS PETERS CO., WASHINGTON, D. C.

UNITED STATES PATENT OFFICE.

MATILDA SOPHIA WHITMAN, OF ST. JOHN, NEW BRUNSWICK, CANADA.

DEVICE FOR TEACHING MUSIC.

964,593. Specification of Letters Patent. Patented July 19, 1910.

Application filed November 17, 1908. Serial No. 463,080.

*To all whom it may concern:*

Be it known that I, MATILDA S. WHITMAN, a subject of His Majesty King Edward VII, in the right of his Dominion of Canada, residing at St. John, county of St. John, Province of New Brunswick, Canada, have invented certain new and useful Improvements in Devices for Teaching Music, of which the following is a specification.

This invention relates to the teaching of music and particularly to such teaching for very young children in music kindergartens or primary grades of sight singing in public schools, and also for blind children.

My invention relates more particularly to the preliminary teaching of the scale form of tone distance without the mental confusion of staff notation or the use of other musical symbols. In other words, it involves the presentation of the idea of tone intervals fundamentally by a means which does not dominate, in memory, the form which it represents to secure a visual or sensible memorization of the fundamental scale forms entirely apart from any written musical notations.

One of the most difficult things in music to present to the immature mind is the interval between the tones of the scale. In order to present this idea in a form capable of being grasped and retained by a child, and also capable of being perceived and comprehended by the blind, I have devised my present invention which also affords a means of presenting various other features of music in such a way as to impress not only the blind, but the seeing child.

To this end I have devised my present invention in which I present prior to any teaching or knowledge of any musical symbols whatever the intervals of the scales. This I do by means of spaces discernible by sight or touch which spaces are of distances corresponding to the degrees of variation between succeeding tones in any scale. In the presentation of these spaces I preferably follow an ascending and descending form. This, of course, corresponds with notation and to that extent is also an advantage in that it makes the study of notation simply a logical development of my system. In the same way the employment of a rounded marker is of advantage in that it lays a proper psychological foundation for future knowledge of notation and proper association between tone and note symbol. It is necessary, however, to bear in mind the fact that while the elements of my system bear a similarity to the notation system they are nevertheless absolutely independent and perfectly capable of comprehension without the slightest knowledge of notation. At the same time the employment of these markers introduced in this preliminary manner and capable of being appreciated through sight or touch or both gives to the knowledge of tone distances a promptness which will not be thereafter confused by a knowledge of notation.

The construction and method of using my invention will be more fully set forth in the specification which follows. In this specification I have discussed an embodiment of my invention which I find best adapted to the present methods of instruction. This embodiment I have shown in the accompanying drawings as a disclosure of the particular embodiment of my invention which I have described and as illustrative of my invention itself.

Figure 2:
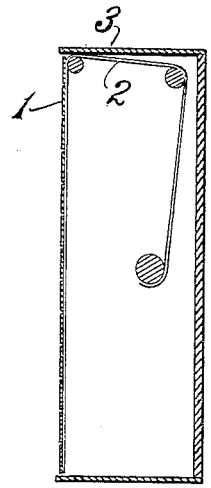
Figure 4:
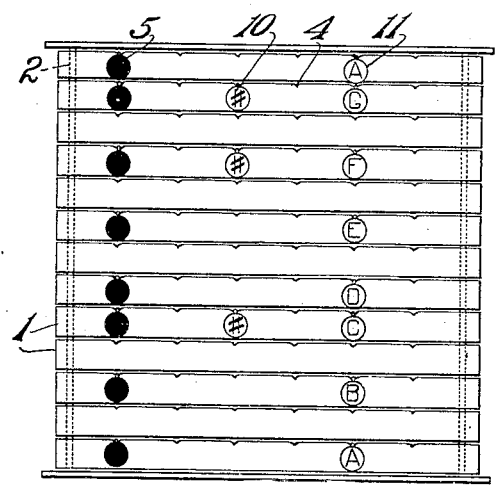
Figure 5:
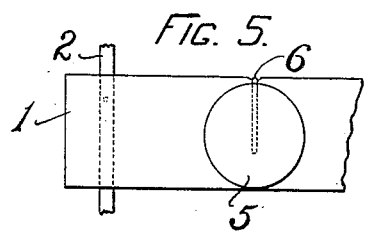
Figure 6:
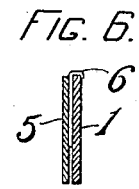
Figure 8:
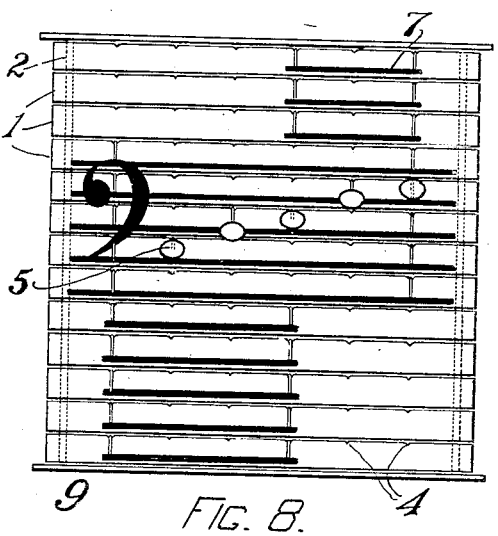
Figure 9:
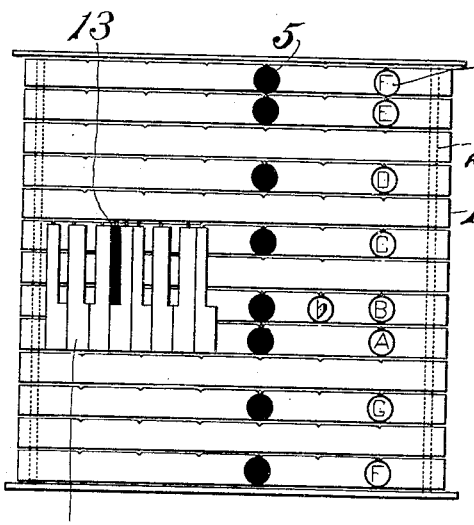
Figure 10:
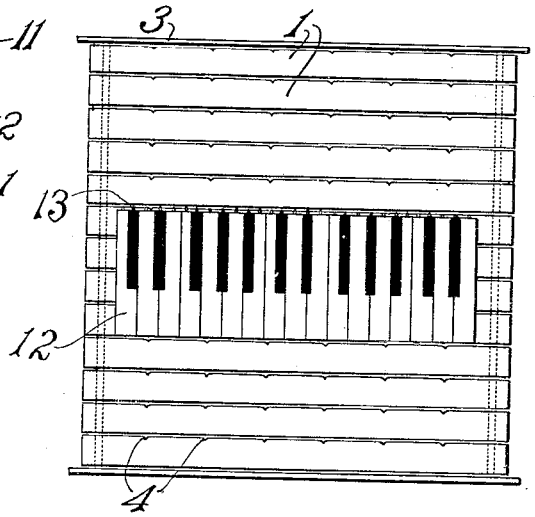

In the drawings Figure 1 is a view of my board with disks applied forming a chromatic scale. Fig. 2, a transverse section of the board and a rolling support for the same, Fig. 3, a view of a board with major and minor scales in indicated color, Fig. 4, a view of major scale with pitch name, Fig. 5 is a detail of a unit strip and a disk, Fig. 6 is a section of the same, Fig. 7, a view of my board with scale, with staff, and ledger lines in treble cleff, Fig. 8, a similar arrangement for the bass cleff, Fig. 9 is a view of a scale with piano key blocks, and Fig. 10 is a view of a set of piano key blocks hung on my board.

1 are a plurality of narrow strips flexibly joined together by a cord or thong 2 and having a suitable support, such as the case 3.

4 are a plurality of notches in the board on the upper edge of the strips 1, there being preferably six of these notches as I find that number sufficient for ordinary use. These notches 4 are particularly adapted to accommodate the blind, although they are of advantage to any small child in properly locating the disks.

Figure 3:
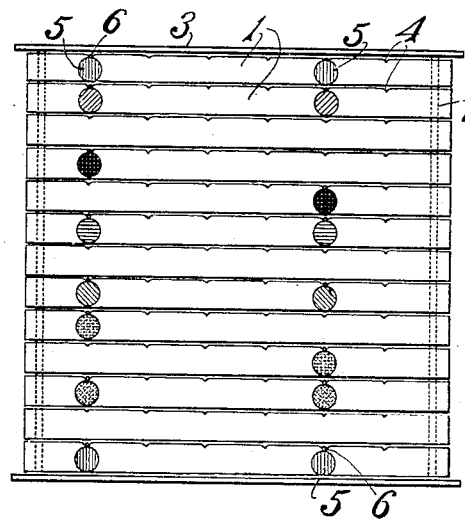
Figure 7:
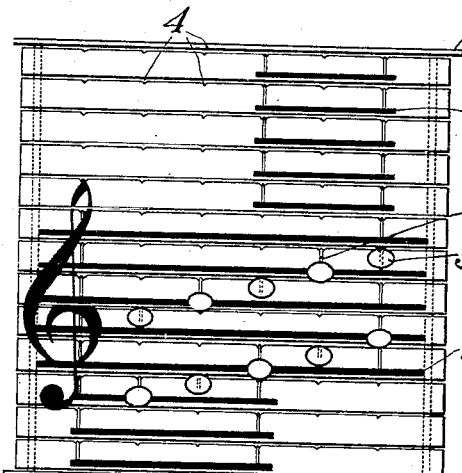

5 are arbitrary markers shown in the form of disks, which form is preferred, and having supporting hooks 6. In my system or method of teaching it is important that these markers be arbitrary and that they remain wholly independent of any note, note form or note character which is to be employed after the pupil has completed the preliminary stage and has mastered the fundamental scale forms of tone distance. There may be substituted for these markers for later stages of teaching such note forms as are shown in Fig. 7. The circular disks may be differentiated by color as indicated in Fig. 3 for small children and I find this of considerable advantage in the teaching of the scale, especially in the memorization of tones and half tones. In Fig. 3 of the drawings, major and minor scales are indicated as colored. By differentiating the disks or markers I am enabled to make it apparent either in the chromatic or diatonic scale just which tones are represented.

Referring to Fig. 1 it will be seen that there is formed by the sensible location of the disks on the board a chromatic scale. This scale is convertible by the moving or removing of the five chromatics into the diatonic major or minor mode, as shown in Fig. 3. The five chromatics may be restored in the modes shown in Fig. 3, the arrangement of the minor mode having been first restored to major. In other words, in Figs. 3 and 4, from which the chromatics have been omitted, it would readily appear just which of the semitones are used and just which of the chromatics are omitted. In such an arrangement as the chromatic scale, shown in Fig. 1, if differentiated by color the chromatics would be readily discernible from the rest of the tones there indicated by markers.

In using my device the board is unrolled and suspended on the wall. As will be seen, there are 13 notched edges upon which markers may be hung. These constitute, therefore, equally spaced positions for the twelve successive chromatic tones of the octave, together with the first tone of the next succeeding octave. The pupils, individually or collectively, apply the disks of proper color if they be so differentiated and they are preferably differentiated to the proper edges of the slats and thus form the chromatic scale shown in Fig. 1. As the markers are applied the tone is preferably associated with the particular marker and with the particular location either by having the pupil or the teacher sing the note or by having the note struck on the piano. After the chromatic scale has been thus learned and the pupil has become familiar with the marker and the relative positions of the elements of the chromatic scale, the diatonic scales are indicated by the removal of the proper chromatics of the particular scale to be learned. The pupil, therefore, becomes familiar not only with each marker and each location but also with the relative positions of the markers as located in any scale. When these fundamental and elementary form members have been thoroughly mastered the notational names may be added to the use of the markers and the pupil may thus gradually be led from the absolute and fundamental knowledge of tone and tone distances and scale to the elementary parts of notational work and to the corresponding relations of musical symbols.

7 are staff and ledger lines which are formed as strips of wood supported by hooks 6 at each end so that they will be distinguished at a glance to seeing children. These hooks are not shown in the drawings but are the same as those used with the disk symbols in Figs. 5 and 6. To the blind dependence is placed on the projection of the strip 7 above the surface of the strips 1. I also provide with each outfit treble cleffs 8, bass cleffs 9, sharps 10, and the various other musical signs, and I also provide a set of raised or fretted letters 11 to be applied as the pitch name for the disks or notes when arranged on the board as a scale or otherwise.

In order to give to a pupil an understanding of the piano key board at the same time that the scale is being thus studied I have provided my key blocks adapted to be hung also upon the board with the other devices above mentioned. These blocks are made in the usual white keys 12 and black keys 13. In Fig. 10 I have shown a set hung on as indicating a corresponding portion of a piano key board while in Fig. 9 I have shown the black keys 13 removed except that corresponding to B flat which occurs in the scale of F which is indicated by the disks 5 and named by the letters 11. In this manner the tone intervals are directly associated with the key board and impressed upon the pupil without the confusing presence of unrelated parts.

In using my device the board is unrolled and suspended before the pupils who hang upon it the various disks before described to produce the scale, properly separated and accompanied by the name letters or other devices. To construct a staff the ledger strips 7 are used and with them may be arranged notes and other devices to form a musical notation. All this is done under the direction and supervision of the teacher who may thus bring the child to assemble the pieces under either the sense of touch or sight, or both.

The apparatus is, of course, capable of use in varied methods of teaching, being readily adaptable to the condition of the pupil.

What I, therefore, claim and desire to secure by Letters Patent is:

1. An apparatus of the class described comprising thirteen uniform slats having similar notches upon their upper edges and flexibly connected edge to edge, a plurality of arbitrary markers differentiated by color, and a notch engaging suspending hook on each marker.

2. An apparatus of the class described comprising a plurality of uniform slats having similar notches upon their upper edges and flexibly connected edge to edge, a plurality of arbitrary, sensibly differentiated markers and a notch engaging suspending hook on each marker.

3. An apparatus of the class described comprising a plurality of uniform slats having similar notches upon their upper edges and connected edge to edge, a plurality of arbitrary differentiated markers and notch engaging suspending means on each marker.

4. An apparatus of the class described comprising a plurality of uniform slats flexibly connected together edge to edge, a plurality of arbitrary markers and suspending means for engaging the edges of said slats on each marker.

In testimony whereof, I affix my signature in presence of two witnesses.

MATILDA SOPHIA WHITMAN.

Witnesses:
 FLORENCE V. STOUT,
 BERTHA E. McADOO.